(12) United States Patent
Loussouarn et al.

(10) Patent No.: US 7,079,541 B1
(45) Date of Patent: Jul. 18, 2006

(54) SYSTEM FOR ACCESS TO A SYNCHRONOUS NETWORK OF THE TYPE COMPRISING TRANSMITTING EQUIPMENT AND RECEIVING EQUIPMENT

(75) Inventors: Yann Loussouarn, Lannion (FR); Francois Thierry, Saint-Quay Perros (FR); Frederic Chatter, Kerbrunec (FR); Alain Fournier, Lannion (FR)

(73) Assignee: France Telecom SA, Paris (FR)

( * ) Notice: Subject to any disclaimer, the term of this patent is extended or adjusted under 35 U.S.C. 154(b) by 0 days.

(21) Appl. No.: 09/958,811

(22) PCT Filed: Apr. 13, 2000

(86) PCT No.: PCT/FR00/00956

§ 371 (c)(1),
(2), (4) Date: Jan. 15, 2002

(87) PCT Pub. No.: WO00/62451

PCT Pub. Date: Oct. 19, 2000

(30) Foreign Application Priority Data

Apr. 14, 1999 (FR) .................................. 99 04852

(51) Int. Cl.
*H04L 12/56* (2006.01)
*H04J 14/00* (2006.01)
(52) U.S. Cl. ..................... 370/395.51; 370/907; 398/45
(58) Field of Classification Search ........ 370/467–474, 370/532–545, 907, 395.5–395.53; 398/44–46, 398/66
See application file for complete search history.

(56) References Cited

U.S. PATENT DOCUMENTS

| | | | | |
|---|---|---|---|---|
| 5,461,622 A | * | 10/1995 | Bleickardt et al. | ........... 370/470 |
| 5,666,351 A | * | 9/1997 | Oksanen et al. | ............ 370/474 |
| 5,706,285 A | * | 1/1998 | Saijonmaa et al. | ...... 370/230.1 |
| 6,496,519 B1 | * | 12/2002 | Russell et al. | ............... 370/465 |

FOREIGN PATENT DOCUMENTS

| | | |
|---|---|---|
| EP | 0814580 | 12/1997 |
| EP | 0901306 | 3/1999 |
| EP | 0993135 A2 * | 4/2000 |
| EP | 0901306 A2 * | 10/2002 |

OTHER PUBLICATIONS

N. Jones et al., "A Poposal for SONET Standards on Virtual Concatenation of High Order Law Order SPE's" Contribution to TI Standards Project, Online Jan. 17-21, a2000 pp. 1-12, XP002150418.*

(Continued)

*Primary Examiner*—Chi Pham
*Assistant Examiner*—Tri H. Phan
(74) *Attorney, Agent, or Firm*—Lowe, Hauptman & Berner, LLP (57) ABSTRACT

A synchronous frame is formed by inserting data in virtual containers that are inserted in the fame. The containers are concatenated with each other. Each concatenated container indicates the total number of containers, and the order number of the particular container. A receiver responsive to the frame delivers to its output only the containers with the indications in the order of the order numbers.

29 Claims, 6 Drawing Sheets

OTHER PUBLICATIONS

ITU-T Recommendations G.707 dated Mar. 1996, Series G: Transmission Systems and Media- Digital Transmission Systems—Terminal Equipments—General—Network node interface for the synchronous digital hierarchy (SDH), pp. 6-17.*

ITU-T Recommendations G.841 dated Oct. 1998, Series G: Transmission Systems and Media- Digital Systems and Networks—Types and Characteristics of SDH Network Protection Architectures, pp. 27-75.*

ITU-T No. G.707 dated Mar. 1996, Series G: Transmission Systems and Media- Digital Transmission Systems—Terminal Equipments—General—Network node interface for the synchronous digital hierarchy (SDH), pp. i-vii, 41-42.*

Dumortier P. et al. "Transport of Gigabit ATM Cell Streams Over Lower Order SDH Backbone" Proceedings of the Conference on Computer Communications (INFOCOM), us, Los Alamitos, IEEE Comp. Soc. Press; pp. 1160-1167 XP000496577—ISBN: 0-8186-557-0, p. 1161, col. 2, line 1-line 37; p. 1162, col. 1 line 21-line 25.

* cited by examiner

SYSTEM FOR ACCESS TO A SYNCHRONOUS NETWORK OF THE TYPE COMPRISING TRANSMITTING EQUIPMENT AND RECEIVING EQUIPMENT

CROSS-REFERENCE TO RELATED APPLICATIONS

The present application is based on, and claims priority from, French Application Number 99/04852, filed Apr. 14, 1999, the disclosure of which is hereby incorporated by reference herein in its entirety.

FIELD OF THE INVENTION

The present invention concerns a system for access to a synchronous network of the type comprising transmitting equipment and receiving equipment.

The present invention applies to any type of transportation by synchronous multiplexing, the two main currently known types of which are synchronous digital hierarchy (SDH) and the American hierarchy known as SONET (Synchronous Optical NETwork).

Although the invention is described in relation to the first of these hierarchies, it will be understood that it can apply to the second, the fundamental principles of which are equivalent if not identical.

BRIEF SUMMARY OF THE INVENTION

A statement is given below of the characteristics defined in the ITU-T Recommendation G.707 relating to synchronous digital hierarchy (SDH) which are necessary for an understanding of the present description.

This Recommendation G.707 defines a basic 155.520 Mbits/sec frame known as STM-1 (Synchronous Transport Module level 1). It also defines containers in each of which the data to be transmitted are included and an overhead known as POH (Path Overhead) in order to form what is called a virtual container VC. Different types of virtual containers are provided according to their capacity and therefore the rate which they make it possible to obtain. Thus virtual container VC4 allows a rate of approximately 150 Mbits/sec, virtual container VC3 a rate of approximately 48 Mbits/sec, VC2 a rate of approximately 7 Mbits/sec and VC12 a rate of approximately 2 Mbits/sec.

Figure 1:
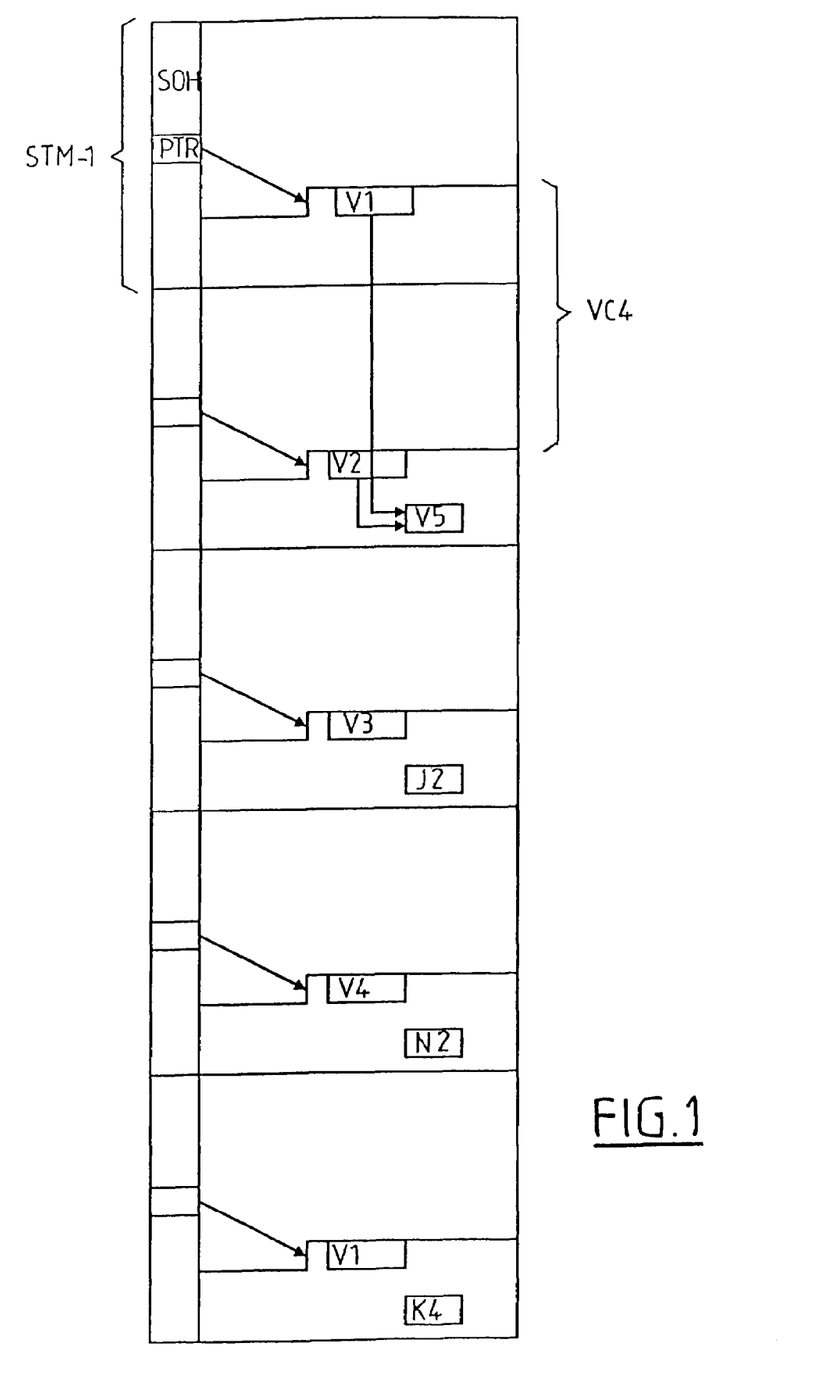
FIG. 1 is a diagram showing the structure of the frames in a synchronous network of the SDH type to which the present invention can be applied.

In FIG. 1, four successive basic STM-1 frames can be seen, forming between them what is referred to in the remainder of the present description as a multiframe. Each basic frame, with a duration of 125 µs, is organised in 9 lines of 270 octets. It is composed of a section overhead SOH, a pointer PTR and a useful load.

The useful load consists of a virtual container VC4 whose position in the STM-1 frame is defined by the pointer PTR. The value of this pointer PTR can be modified when the frame rate is shifted by plus or minus with respect to the rate of the virtual container VC4. Positive or negative justification mechanisms are also provided in order to take account also of these frequency shifts.

Figure 2:
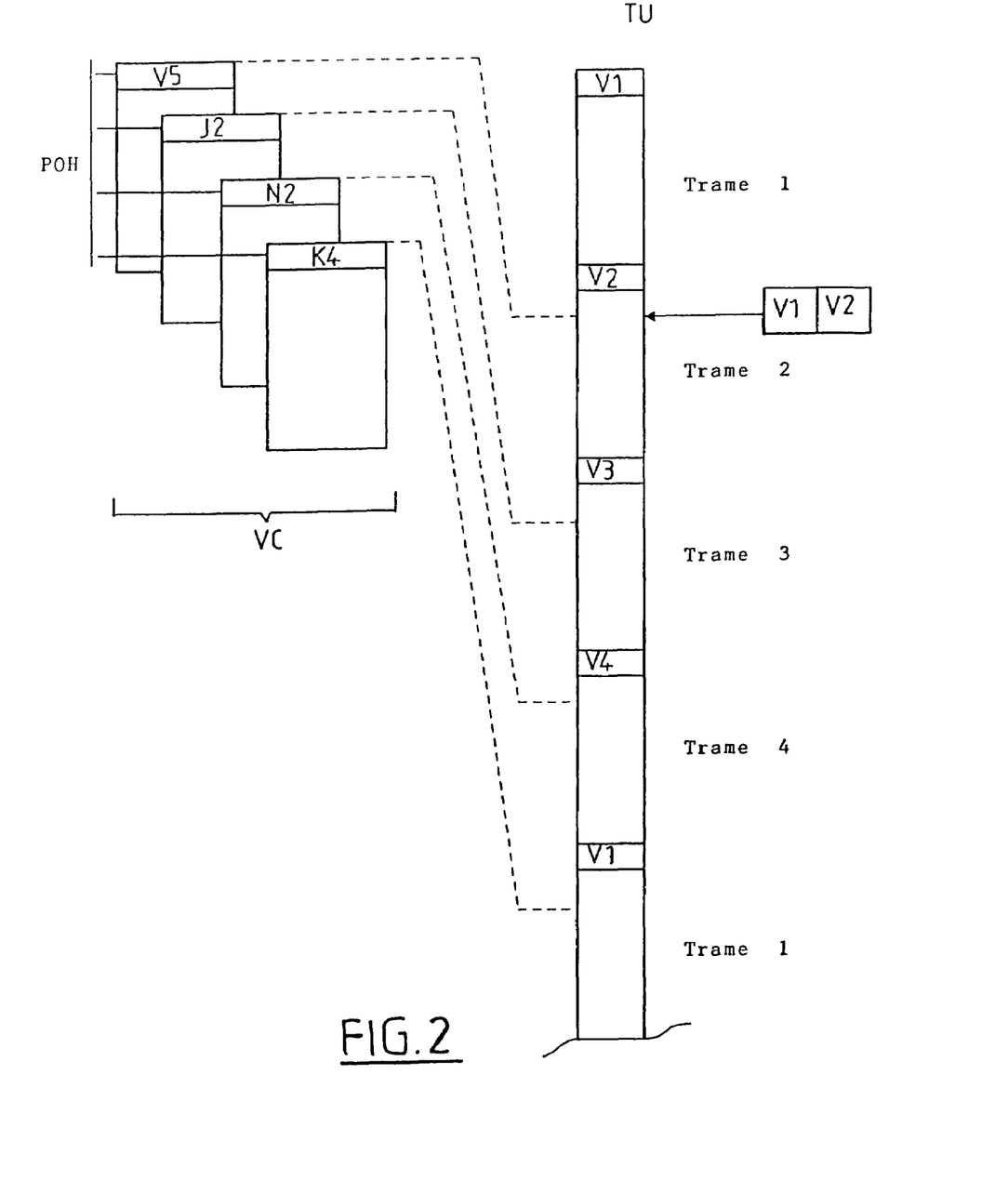
FIG. 2 is a diagram showing the structure of the virtual containers which are concatenated according to the present invention.

In FIG. 2, a virtual container VC can be seen, which can be of the VC12 or VC2 type and which consists, distributed over four basic STM-1 frames, of four parts of identical size, each having a header octet (reference in the standard V5, J2, N2 or K4) and a load available to the user.

In the remainder of the description, each of these parts will be named a virtual subcontainer equivalent to a quarter of a virtual container, which will therefore be either a virtual subcontainer of VC12 or a virtual subcontainer of VC2.

The size of a virtual subcontainer is either 35 octets if it is a subcontainer of VC12, or 107 octets if it is a subcontainer of VC2. Each virtual subcontainer has a header octet (V5, J2, N2 or K4) and therefore 34 or 106 useful load octets. The set of header octets constitutes the path overhead POH of the corresponding virtual container.

The respective functions of these overhead octets are described in Recommendation G707. It will merely be noted that octet J2 normally serves to periodically transmit an identifier for an access point to a path of lower level. This path access point identifier is defined by a message in 16 octets.

It should be noted that a multiframe may contain up to 63 VC12 virtual containers or up to 21 VC2 virtual containers.

Each VC12 or VC2 virtual container is inserted in a TU12 or TU2 tributary unit. Because the data of the VC12 or VC2 virtual container and the TU12 or TU2 tributary unit are not synchronous, the VC12 or VC2 virtual container can float within this tributary unit so that a pointer is necessary in order to indicate its start in the tributary unit TU. This pointer is transported by the octets V1 and V2 situated in the overhead of the tributary unit TU and points to the first octet of the corresponding virtual container, that is to say the octet V5 of the overhead POH, as can be seen in FIG. 1a. It should be noted that this pointer is defined for a multiframe and that it can be modified when the transmission rate of the tributary unit is shifted by plus or minus with respect to the rate of the VC2 or VC12 virtual container. Positive or negative justification mechanisms are also provided to take account also of these frequency shifts.

Finally, each tributary unit TU is inserted in four VC4 virtual containers of four successive STM-1 frames. Each tributary unit TU is synchronous with the VC4 virtual container containing it.

At the present time, an SDH network can offer at a maximum only five useful transportation rates, which correspond to the following virtual containers used:
virtual container of the VC4 type: 150 Mbits/sec,
virtual container of VC3 type: 48 Mbits/sec,
virtual container of the VC2 type: 7 Mbits/sec,
virtual container of the VC12 type: 2 Mbits/sec,
virtual container of the VC11 type: 1.5 Mbits/sec.

The consequence of the transportation of flows of intermediate rates is not only poor filling of the virtual containers and therefore of the SDH synchronous paths but also, because of the SDH multiplexing structure, a loss of resources in the form of VC11, VC12, VC2 or VC3 virtual containers which could be available per STM-1 frame for other flows adapted to these virtual containers.

Thus not only are the rates, for example between 50 and 100 Mbits/sec, transported by a VC4 virtual container with a low filling rate of between 33% and 66%, but also it is impossible to use, for other flows, the virtual containers VC of lower order (VC11, VC12, VC2 or VC3) made unavailable in the STM-1 frame which is occupied entirely by this poorly filled VC4 virtual container.

To resolve this problem, Recommendation G.707 provides for the virtual concatenation of TU-2 units in a VC-4 container of higher level. This concatenation allows the transportation of data in m×TU-2 units without using the concatenation indication in the pointer octets.

It is also mentioned that the processing of the pointer in intermediate equipment may cause differences in the delay of the signals of virtually concatenated individual VC2 containers.

There is also known, in order to partly resolve this problem of filling SDH containers, according to the patent document EP-A-814 580, a hybrid multiplexer which comprises first reception means for receiving the content of a large-capacity SDH container, concentration means for reducing the number of ATM cells in the container received by eliminating the empty cells which were contained therein, generation means for generating a lower-capacity SDH container with the ATM cells retained and any empty padding cells, multiplexing means for effecting the SDH synchronous multiplexing of the lower-capacity containers and transmission means for transmitting the SDH container thus generated.

In the present invention, the concatenation in question is always virtual. The latter term will not be used routinely to designate it, but it will be understood that it will nevertheless be implied.

However, no mechanism is provided by Recommendation G.707 for recovering the concatenated virtual containers if these are subject, during their transportation in the SDH network, either to a change in position in the frame, or movements of their TU2 or TU12 unit pointers.

Likewise, no mechanism is provided for putting the concatenated containers back in phase when these are subject to large phase shifts greater than one multiframe.

In addition, no mechanism is provided by Recommendation G.707 for projecting the service rate into containers and then concatenating them, in order to adjust the service rate to a reserved rate.

The purpose of the present invention is to propose a system for access to a synchronous network which makes it possible to resolve these problems, and in particular to propose such a system for transmitting data over a synchronous network of the SDH type so as best to use the capacity of the frames both for the source data flow and for the other flows of the intermediate equipment of the SDH network.

Such a system for the transmission of data by a synchronous network is of the type which comprises at least one item of transmitting equipment and at least one item of receiving equipment, the said data being supplied at the input of the said transmitting equipment in order to be inserted in concatenated virtual containers which are themselves inserted in synchronous frames in order to be transmitted to the said receiving equipment.

According to one characteristic of the present invention, the said transmitting equipment has a unit for measuring the rate of the incoming data flow and a parameterising unit which deduces, from the measurement made by the said measuring unit, the total number of virtual containers of lower order to be virtually concatenated in order to transport the said data flow in the said frames, the header of each concatenated container carrying a message giving the total number of concatenated containers and the order number of the said container amongst the said concatenated containers, the said receiving equipment delivering only the containers carrying the said message, and this in the order given by the said message.

According to another characteristic of the invention, the said network is of the SDH type in accordance with Recommendation G.707 and, for a given concatenated virtual container, the said message consists of the sixteen J2 header octets successively transmitted in sixteen successive multiframes.

According to another characteristic of the invention, the said receiving equipment functions according to at least two distinct phases, a learning phase in which, by means of the message carried by each of the said containers, the said receiving equipment marks, in the frames received, the position of each concatenated container received, and a normal functioning phase in which, on the basis of each position thus determined, it delivers the said concatenated containers to a unit for recovering the said data.

According to another characteristic of the invention, the said transmitting equipment functions according to at least two distinct phases, an initialisation phase during which the measuring unit measures the incoming flow rate and the parameterising unit derives therefrom the total number of virtual containers to be reserved for the transportation of the said data of the incoming flow and then a normal functioning phase during which the said data are inserted in the said reserved virtual containers, the said transmitting equipment leaving the said normal functioning phase in order to enter the said initialisation phase when the said measuring unit indicates that the said measured rate is greater than the maximum rate which can be offered by the total number of reserved concatenated containers.

According to another characteristic of the invention, the said transmitting equipment comprises a container formation unit in order to form the said concatenated containers by means on the one hand of the useful data of the incoming flow and on the other hand, if these are not available in sufficient quantity at the time in question, by means of padding data necessary for saturating the rate offered by the said virtual containers.

According to another characteristic of the invention, in a first embodiment, each subcontainer has, in addition to its header, a length octet which represents the quantity of useful data and/or the quantity of padding in its useful load.

According to another characteristic of the invention, and in another embodiment, the said transmitting equipment has a buffer which is supplied by the said incoming flow and which is designed to deliver, at its request, blocks of data useful to the said formation unit, and a control unit which either controls the delivery by the said buffer of one or more blocks of useful data when these are available in the said buffer memory, or delivers blocks of padding data when the quantity of useful data in the said buffer is less than the quantity of data in a block. Each of the said blocks of data has for example the size of a virtual subcontainer so as to fill its useful load, each virtual subcontainer being either of a type where it contains useful data or of a type where it contains padding data.

According to another characteristic of the invention, each subcontainer comprises, in addition to its header, an octet representing the type of data which it contains.

According to another characteristic of the invention, the said type octet has seven bits which express the word 1010101 when the said subcontainer is transporting useful data and the binary word 0101010 when it is transporting padding data, the said octet being recognised at the receiving equipment by calculating the Hamming distance between the seven bits of the octet received and the value 1010101 and by comparing this distance with the figure four, the subcontainer received being of the type where it contains useful data if the said distance is less than four and being of the type where it contains padding data if this distance is greater than or equal to four.

According to another characteristic of the invention, the said buffer delivers the respective values of a high pointer and of a low pointer, the said control unit delivering blocks of padding data when the difference between these two values is less than the size of a subcontainer, until the said difference once again becomes greater than the size of a subcontainer, the said control unit then controlling the delivery, by the buffer, of the data blocks which it contains.

According to another characteristic of the invention, the said incoming flow is a flow of ATM cells and each of the said blocks of the data has the size of one or more ATM cells.

According to another characteristic of the invention, the said blocks of data are stored in a multiframe, consecutively filling the reserved containers.

According to another characteristic of the invention, the said blocks of data are stored in a multiframe distributing the said blocks one after the other on the reserved containers.

According to another characteristic of the invention, the said receiving equipment is provided at its output with a buffer which is supplied by the recovered data extracted from the concatenated virtual containers received, at the extraction rhythm of the said data, and which is read at a regular rhythm.

According to another characteristic of the invention, the said message also carries an identifier for the said transmitting equipment.

The present invention also concerns a method of transmitting data by means of a synchronous network of the type in which the said data are inserted in virtual containers which are themselves inserted in synchronous frames in order to be transmitted.

According to one characteristic of the present invention, the said transmission method consists of measuring the rate of the incoming data flow, deriving from the result of the said measurement the total number of virtual containers to be concatenated in order to transport the said data flow in the said frames, and providing each of the said containers to be concatenated with a message giving the total number of concatenated containers and the order number of the said container amongst the said concatenated containers.

According to another characteristic of the invention, the said network is of the SDH type in accordance with Recommendation G.707 and the said method is characterised in that, for a given concatenated virtual container, the said message consists of sixteen J2 header octets successfully transmitted in sixteen successive multiframes.

According to another characteristic of the invention, on reception of a frame containing concatenated containers, two distinct steps are implemented, a learning step in which, by means of the message carried by each of the said containers, the position of each concatenated container received is recovered in the received frames and a normal functioning step in which, on the basis of each position thus determined, the said concatenated containers are delivered so that the said data can be recovered.

According to another characteristic of the invention, it consists of putting the reserve containers back in phase, on reception, by analysing the offset in the octets constituting the message carried by each of them.

According to another characteristic of the invention, on transmission, two distinct phases are implemented: an initialisation phase during which a measurement of the rate of the incoming flow is carried out and the total number of virtual containers to be reserved for the transportation of the said data of the incoming flow is derived, and a normal functioning phase during which the said data of the incoming flow are inserted in the said reserved virtual containers, the said normal functioning phase being abandoned for the said initialisation phase when the said measured rate is greater than the maximum rate which can be offered by the total number of reserved concatenated containers.

According to another characteristic of the invention, it consists of using, in order to form the said concatenated containers, on the one hand useful data of the incoming flow and on the other hand, if these are not available in sufficient quantity at the time in question, padding data necessary for saturating the rate offered by the said virtual containers.

According to another characteristic of the invention, the said message also carries an identifier for the said transmitting equipment.

The present invention also concerns a synchronous frame for the transportation of data flows, the said data being inserted in virtual containers which are themselves inserted in the said synchronous frame.

According to another characteristic of the invention, each of the said containers which are concatenated with each other carries a message giving the total number of concatenated containers and the order number of the said container amongst the said concatenated containers.

According to another characteristic of the invention, the said frame is of the SDH type in accordance with Recommendation G.707 and is also characterised in that, for a given concatenated virtual container, the said message consists of sixteen J2 header octets successfully transmitted in sixteen successive multiframes.

According to another characteristic of the invention, each subcontainer has, in addition to its header, an octet of the type which indicates whether it is carrying, in its useful load, useful data or padding data.

According to another characteristic of the invention, the said type octet has seven bits which express the word 1010101 when the said subcontainer is transporting useful data and the binary word 0101010 when it is transporting padding data.

According to another characteristic of the invention, each subcontainer has, in addition to its header, a length octet which represents the quantity of useful data and/or the quantity of padding in its useful load.

BRIEF DESCRIPTION OF THE DRAWINGS

The characteristics of the invention mentioned above, as well as others, will emerge more clearly from a reading of the following description of an example embodiment, the said description being given in relation to the accompanying drawings, amongst which.

DETAILED DESCRIPTION OF THE DRAWINGS

Figure 3:
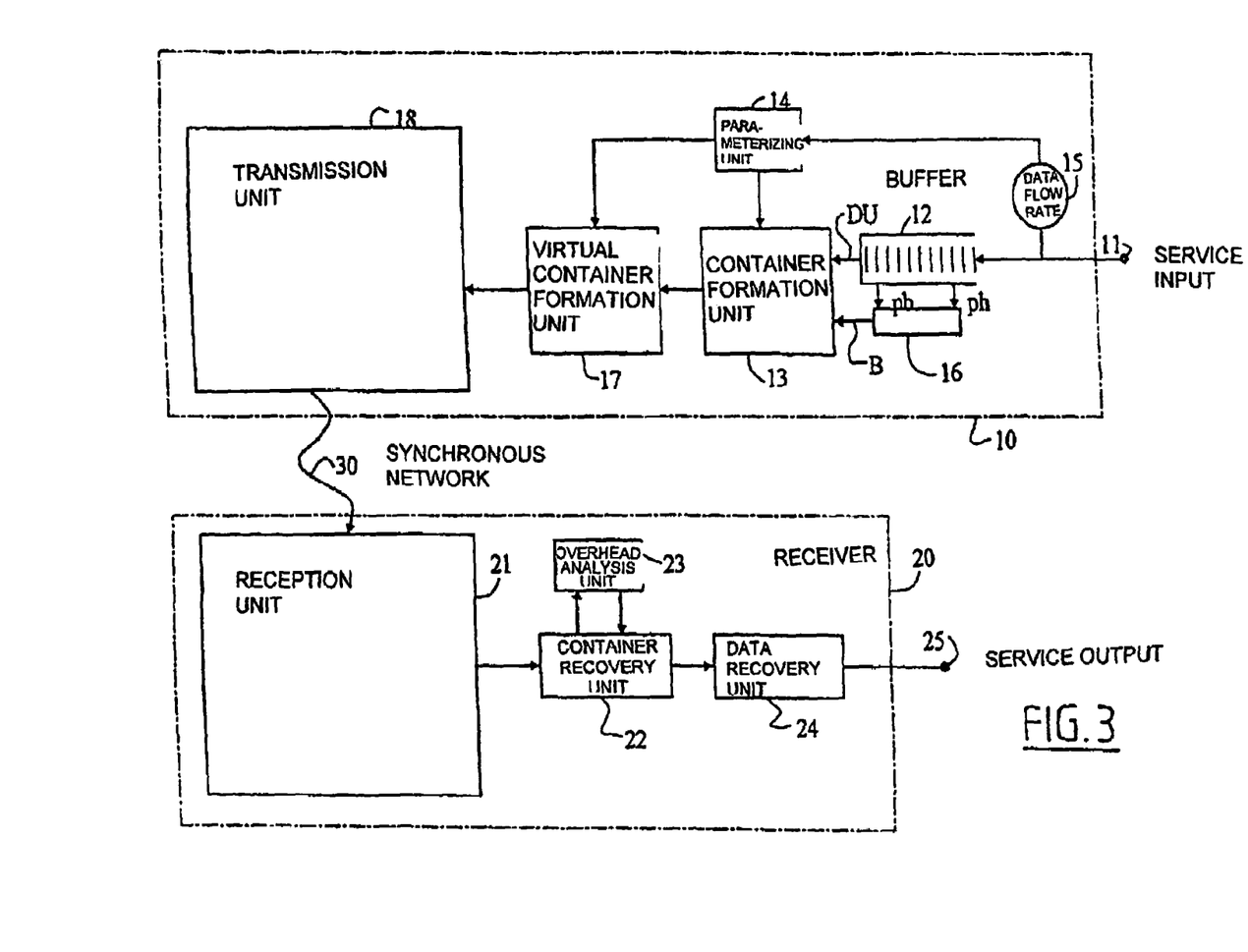
FIG. 3 is a block diagram of a system for the transmission of data by a synchronous network according to the present invention.

There will be considered; in relation to FIG. 3, transmitting equipment 10 in communication with a receiver 20 through a synchronous network 30, for example of the SDH (Synchronous Digital Hierarchy) type based on Recommendation G.707 of the ITU-T referred to above or of the SONET type.

The transmitting equipment 10 has a service input 11 through which the data to be transmitted are input. In the context of the present invention, these data can be in various formats such as for example: ATM cells, broad-band digital signals of the NRZ binary type, data to the G.703 PDH format, audio-digital signals to the AES/UER format or compressed audio-visual signals to the MPEG2-TS format, IEEE 802.3 or Ethernet data frame, etc.

These data are supplied to a buffer 12 of the type known in the art as FIFO (First In, First Out). This buffer 12 delivers the useful data DU which it has stored to a container formation unit 13, at the request of the said unit 13. A parameterising unit 14 is controlled, as explained below, by a unit 15 for measuring the data flow rate at the input 11 of the transmitting equipment.

The buffer 12 also delivers the respective values of a high pointer $ph$ and a low pointer $pb$ representing its filling level. These pointer values are supplied to a rate control unit 16 which delivers, to the container formation unit 13, as will be explained below as a function of the filling levels of the buffer 12, padding data B.

The function of the unit 13 is to form, by means of the useful data DU delivered at its own request by the buffer 12 and padding data B supplied by the rate control unit 16, C2 or C12 containers. It receives, from the parameterising unit 14, various parameters and in particular the number of containers N to be concatenated and the type, C2 or C12, to be considered.

The unit 13 delivers the C2 or C12 containers which it forms to a virtual container formation unit 17 provided for adding V5, J2, N2 and K4 overhead octets to the C2 or C12 containers and thus form VC2 or VC12 virtual containers. The unit 17 receives, from the parameterising unit 14, a J2 octet which constitutes one of the said overhead octets.

The virtual containers thus formed are delivered to a transmission unit 18 which, as explained above, inserts them in VC4 containers, which projects the said VC4 containers into STM-1 frames and transmits the said STM-1 frames, via the SDH network 30, to the receiver 20.

It will be recalled that the VC2 and VC12 containers are defined on a multiframe defined as being the succession of four STM-1 frames whilst the VC4 virtual container for its part is defined on an STM-1 frame.

The receiver 20 receives the said frames through a reception unit 21 which, in a manner known per se, after interpretation of the pointers PTR (which are not necessarily the same as those which were determined by the transmitting equipment 10 notably because of the passage of the said frames through the SDH network 30), recovers the VC4 containers, and then the TU2 or TU12 tributary units which the said containers contain and, after interpretation of the corresponding pointers V1 and V2, delivers VC2 or VC12 virtual containers to a container recovery unit 22 provided for recovering the corresponding C2 or C12 containers. The unit 22 is controlled by an overhead analysis unit 23 which analyses the overhead octets V5, J2, N2 and K4 and enables it to extract only the C2 or C12 containers resulting from the concatenation, as will be explained below. Finally, the C2 or C12 containers supplied by the unit 22 are delivered to a data recovery unit 24 which on the one hand recovers the initial data and on the other hand recovers the rhythm and makes regular the rate of the said data which are then delivered at a service output 25.

The unit 24 consists for example of a buffer of the FIFO type, where the writing of the data is synchronous with the C2 or C12 containers delivered by the unit 22 and is therefore because of this sporadic, and where the reading of the data is on the other hand slaved to its filling level making the data output rate regular.

A description will now be given of the functioning of the transmitting equipment 10. It functions in two distinct phases: an initialisation phase and a normal functioning phase.

The initialisation phase is implemented when the transmitting equipment 10 is started up. There, the different cards constituting the equipment are configured and any anomalies and alarms which may prevent start-up are detected.

During this phase, the rate measuring unit 15 measures the rate of the incoming data flow and transmits the result of this measurement to the parameterising unit 14, which then derives therefrom the number N of VC12 or VC2 virtual containers which it is necessary to reserve in order to transmit the service data issuing from the input 11 and which stores this value N. For example, the number N of VC12 or VC2 containers to be reserved is equal to the integer just greater than the ratio of the rate thus measured $D_{mes}$ to the useful data rate $D_{vc12}$ or $D_{VC2}$ corresponding to a VC12 or VC2 container, taking into account the different overheads necessary.

For example, if the measured rate $D_{mes}$ is 25 Mbits/sec and the virtual containers in question are VC2 containers whose rate $D_{vc2}$ is 6784 kbits/sec, the number N will be equal to 4.

It will be understood that, in the context of Recommendation G.707 referred to above, the number N will be no more than 63 for VC12 containers offering a useful data rate $D_{vc12}$ and 21 for VC2 containers offering a useful data rate $D_{vc2}$. The exact values of the rates $D_{VC12}$ and $D_{VC2}$ will be seen subsequently.

If the number of containers to be reserved is equal to the number N already used during a previous operating phase (the number N is stored in the parameterising unit 14), no modification is necessary and the equipment goes directly into the subsequent operating phase.

It should be noted that the fact that the number N is stored makes it possible to restart the equipment in its last state, without human intervention, after a mains power cut has occurred.

If the number of containers to be reserved is greater than the previously stored number N, its new value N is stored in place of the previous one in order to be taken into account. A confirmation from the user may be requested in order to make it possible to artificially increase, during transmission, the number of concatenated VC12 or VC2 virtual containers in expectation of an increase in the input rate.

The number N and the type of C2 or C12 containers used are stored by the unit 14 in order to be delivered, during the subsequent operating phase, to the container formation unit 13.

During this phase, the transmitting equipment 10 functions as follows.

At each moment, the measuring unit 15 measures the rate $D_{mes}$ of the data flow at the input 11. The parameterising unit 14 checks whether the data rate $D_{mes}$ thus measured can be transported by the N VC12 or VC2 containers reserved during the initialisation phase.

If such is not the case, an alarm is activated and the transmitting equipment exits from the operating phase in order to enter a new initialisation phase where a new number N of VC12 or VC2 virtual containers to be reserved will then be calculated.

It should be noted that the operator can at any time interrupt the transmission. The equipment then exits from the operating phase in order later to resume an initialisation phase.

The container formation unit 13, on the basis of the values of the parameters which are transmitted to it by the parameterising unit 14, notably the value N and the type of VC12 or VC2 virtual containers used, requests the buffer 12 to supply useful data DU to it in the form of one or more blocks of octets or, if these are not available in the required quantity, to supply to it, via the rate control unit 16, padding data B which will then serve to saturate the rate offered by the N containers reserved.

It should be noted that the size of the blocks of octets depends on the format of the data to be inserted in the container. For example, according to the invention, if these are binary data of the NRZ type, a block will correspond to the octets which are necessary for filling the useful load of a S-VC12 or S-VC2 subcontainer, that is to say respectively 33 or 105 octets. If they are data in the form of ATM cells, a block will correspond to an ATM cell, that is to say to 53 octets.

The unit 13 then forms C12 or C2 containers from these useful data DU and padding data B.

Figure 4A:
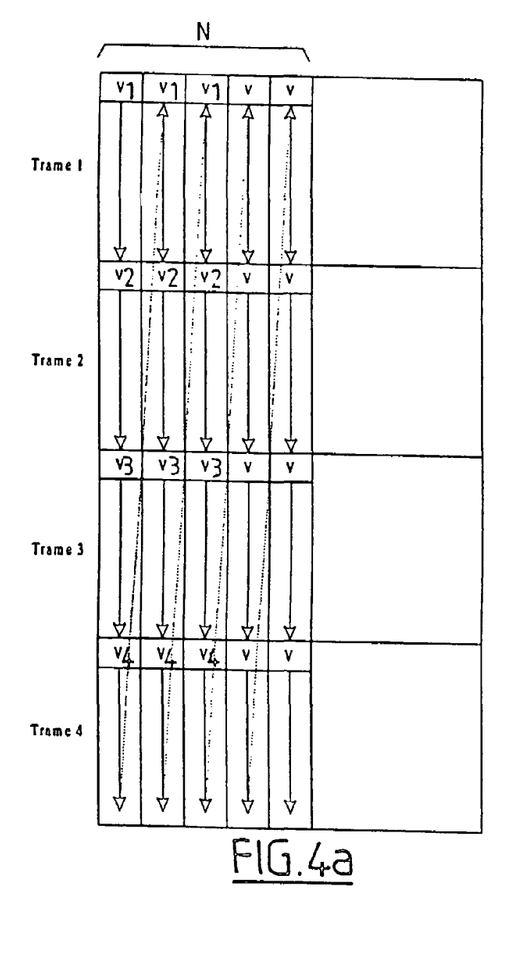
FIGS. 4a and 4b are a diagram illustrating the filling of the concatenated virtual containers according to two distinct modes.
Figure 4B:
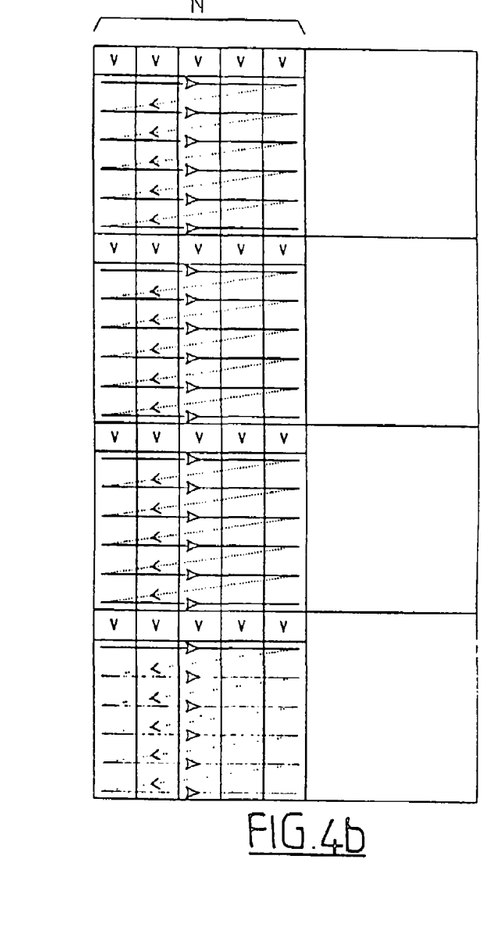

The blocks of data can be stored in a multiframe either by filling the N containers consecutively (see FIG. 4a) or by distributing the blocks of data one after the other over the N reserved containers (see FIG. 4b).

In the first case (FIG. 4a), the blocks are inserted container after container so that it is necessary to await the complete filling of the N containers before being able to transmit the multiframe. The latency of the process is then four frames, that is to say, for a frame duration of 125 µs, a latency of 500 µs.

In the second case (FIG. 4b), the filling of the N reserved containers takes place frame by frame. Each block of data is distributed over the octets of the N reserved containers. A frame can be transmitted as soon as it is filled, so that the latency of the process is only one frame, that is to say, for a frame duration of 125 µs, a period of 125 µs.

The unit 17 attaches to each subcontainer a header octet, which is either the octet V5, or the octet J2, or the octet N2, or the octet K4 in accordance with Recommendation G.707 and thus forms the VC2 or VC12 virtual containers according to circumstances.

The unit 17 continuously numbers each container used and thus positions its J2 octet so as to form a so-called J2 identifier message, constructed from a certain number of J2 octets present in the path overhead POH of the same number of successive multiframes. The number of J2 octets forming the said J2 identifier is advantageously 16 in order to be in accordance with Recommendation G.707, which provides for the formation of such a message without however defining the content thereof. Likewise, in more general terms, the format of the J2 identifier is in accordance with Recommendation G.707.

According to the present invention, the J2 identifier forms a message specific to the equipment used in order to be able to identify with reliability the concatenated containers VC belonging to a given item of equipment amongst all the virtual containers received in the multiframe. It also makes it possible to verify the sequencing of the concatenated containers and the integrity of the concatenation.

This makes it possible to resolve the problems of marking and extraction of the concatenated virtual containers received, problems related to the fact that, in the SDH network 30, the values of the pointers V1 and V2 allocated to these virtual containers are not necessarily preserved because of their change in position. In addition, the order of the containers may also not be preserved and their position within the frame may be modified in the network between transmitting equipment and receiving equipment, for example cross-connection, multiplexing etc equipment of the SDH network.

Figure 5:
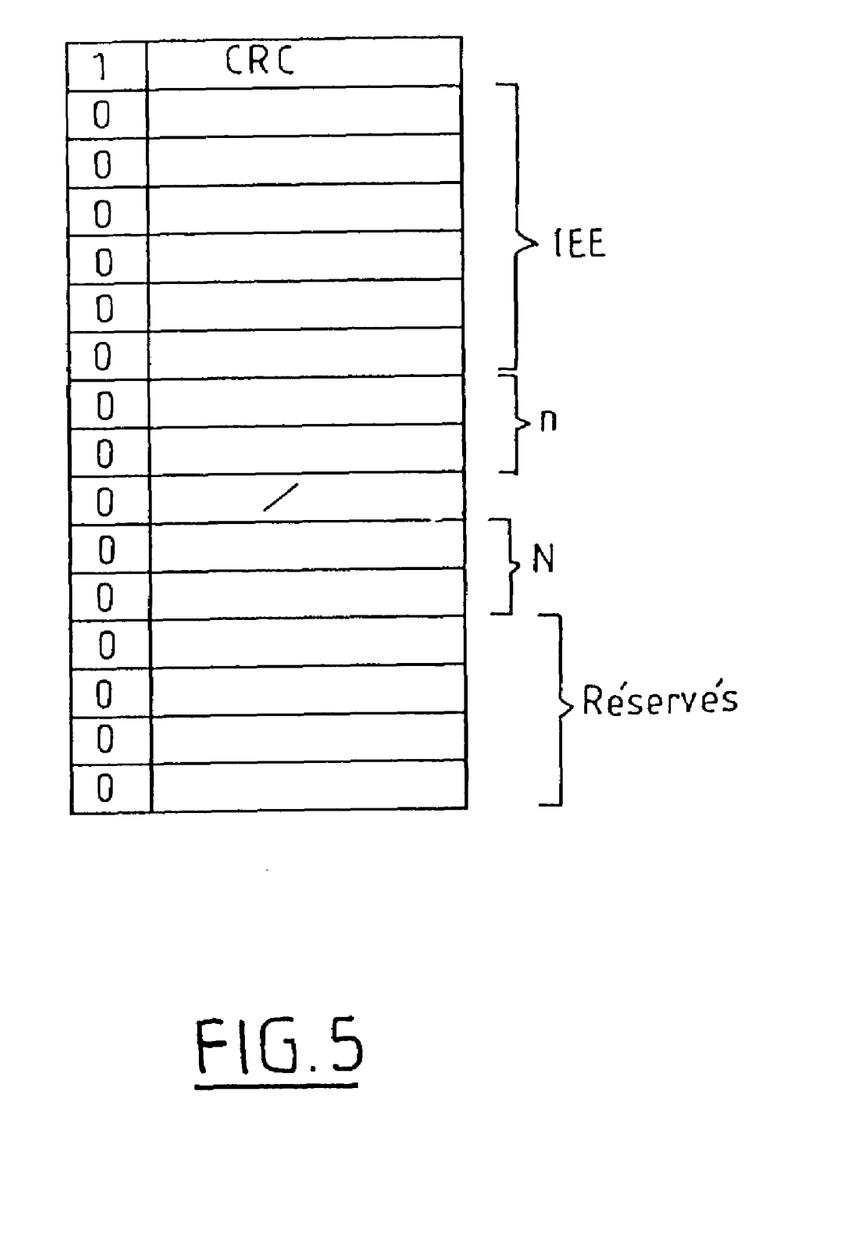
FIG. 5 is a diagram illustrating the structure of the message carried by each of the concatenated virtual containers.

As can be seen in FIG. 5, the message carried by the J2 octets consists essentially of three fields: an identifier for the IEE transmitting equipment, the order number $\underline{n}$ of the container concerned and the total number N of containers which have been concatenated by the transmitting equipment identified.

These fields are for example expressed in clear in so-called ASCII code, the first in six octets, the second in two octets and the third also in two octets. A separator may be provided between the order number $\underline{n}$ and the total number N of containers reserved by multiframes.

In addition, one octet, for example the first, of the J2 identifier may, in accordance with Recommendation G.707, contain a cyclic redundancy check (CRC) code associated with the J2 identifier previously received, and the other octets are intended for the message proper.

The J2 identifier also contains octets reserved for other applications (here four in number).

The VC12 or VC2 virtual containers formed by the unit 17 are transmitted to the unit 18, which projects them into the TU12 or TU2 units, which are inserted in the virtual containers VC4 of successive frames in order then to be transported by the SDH network 30 in multiframes formed by four STM-1 frames.

As for the receiving equipment 20, this functions as follows. The STM-1 frames received from the SDH network 30 are analysed in the unit 21, which then delivers, from corresponding containers VC4, virtual containers VC12 or VC2. In order to take account of the differences in the values of the pointers between concatenated virtual containers due to the change in their position when they are transmitted in the SDH network, it may be necessary to store at least four consecutive STM-1 frames, or even several multiframes.

This may in particular be the case when two concatenated containers undergo, in the SDH network, a significant phase shift exceeding one multiframe. The J2 identifier will make it possible to put them back in phase as long as this phase shift does not exceed eight multiframes. This is because, if two concatenated containers are shifted in phase by P multiframes, at a given moment, one will deliver the $K^{th}$ J2 octet of the J2 message and the other will deliver the $(K+P)^{th}$ J2 octet. It will be understood that, during the analysis of the J2 octets received (which is carried out during the learning phase of the receiver 20 (see below)), it is possible to deduce the phase shift P between these two containers.

Since the J2 octet comprises 16 octets, the maximum phase shift which can thus be determined is 8 multiframes. For example, a phase shift of P(P>8) multiframes can be interpreted as a positive phase shift of P multiframes or as a negative phase shift of (16-P) multiframes.

It will be understood that it may then be necessary to store up to eight multiframes in order to recover these phase shifts.

The unit 22 analyses the headers of these VC2 and VC12 virtual containers and, in particular, extracts the J2 octet, which it then supplies to the unit 23. The unit 22, as disclosed below, then delivers the C2 or C12 virtual containers which had been concatenated with a unit 24 which disassembles them so as to recover the flow of initial data at the output 25.

More precisely, the receiving equipment 20 functions according to essentially three distinct phases, the initialisation phase, the learning phase and the operating phase.

The initialisation phase is implemented when the reception equipment is started up. The different cards which constitute the equipment are configured and any anomalies and alarms which may prevent correct functioning of the system are detected. Once this initialisation phase has been carried out, the equipment goes into the learning phase.

During the learning phase, the J2 octets delivered by the unit 22 are read by the unit 23, which reconstitutes and interprets the J2 identifier carried by the J2 overhead octets (for example sixteen in number) of successive multiframes. The unit 23 then delivers the value of the number N of containers which have been concatenated at the transmitting equipment in question as well as the value of the order number n of the container in question. These two values are recorded by the unit 23 and delivered to the unit 22, which will thus be able to enter its third operating phase. At the end of this phase, the receiving equipment 20 is synchronised with the transmitting equipment 10.

It is during this learning period that the phase difference between the concatenated containers is determined.

It should be noted that the containers which do not relate to the transmitting equipment in question are rejected without interpretation of their J2 octet.

In addition, it should be noted that, during this learning phase, the recovery of the data flow is deactivated.

When it possesses the position in the multiframe of the N containers used, the receiving equipment passes to the operating phase.

During the operating phase, there is first of all a reception by the unit 21 of the receiving equipment 20 of the frames issuing from the transmission path 30.

The processings related to the SDH transportation layer between the physical interface and the S2 or S12 layer are described in the functional model of Recommendation G.707 mentioned above. At each multiframe received, the pointers of the containers situated in the V1 and V2 overhead of the TU12 or TU2 tributary units are saved in a memory. There is then extraction of the VC12 containers or VC2 containers from the TU12 or TU2 tributary units.

The VC12 or VC2 virtual containers received are in accordance with Recommendation G.707. The unit 23 processes the octets of their overhead V5, J2, N2 and K4 and reconstitutes the message transported by the J2 identifier. The virtual containers which have been received but which have not been recognised as appearing amongst those which are pointed to by the identifier J2 determined during the synchronisation phase are rejected. For the others, the blocks of useful data contained in the C12 or C2 containers are extracted by the unit 22 from the VC12 or VC2 virtual containers delivered by the unit 21 and are then delivered to the unit 24, which then delivers the flow of data recovered at the service output 25.

The message in 16 octets transported by the J2 identifier is interpreted by the unit 23 even outside the learning phase. It makes it possible to verify that the configuration of the concatenated containers in the multiframe has not changed. Should it happen to vary, the equipment should go back into the learning phase.

When the service data transmission rate at the input 11 is less than the rate reserved by means of the N VC2 or VC12 containers, it is necessary, in order to saturate the path rate, to add to the useful data DU data known as "padding" data B, that is to say ones which do not represent useful information.

The introduction of the padding data B into a C2 or C12 container may take place either directly in the container itself or at the ATM layer considering the padding cells which are then introduced into the container just like any other ATM cell.

With regard to direct introduction, the padding data B may be transmitted mixed at the octet level with useful data DU within one and the same virtual subcontainer. The configuration of a virtual subcontainer is then the one depicted in FIG. 6a. This virtual subcontainer has a useful load CU in which the useful data DU are inserted and a padding B in which the padding data are inserted. It also has a header octet H (which is one of the octets V5, J2, N2 or K4) followed by an octet L which indicates the length, for example expressed in numbers of octets, of the useful load CU.

Figure 6A:
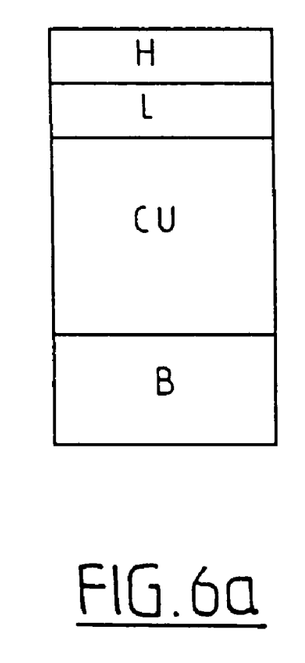
FIGS. 6a to 6c are diagrams illustrating the filling of the virtual containers by means of the useful data and the padding data according to two embodiments of the invention.

It will be recalled that a virtual subcontainer comprises 35 or 107 octets. Consequently, having regard to the header octet H of the octet L, the useful load CU will have a maximum length of 33 or 105 octets. The maximum rate $D_{VC2}$ provided by a VC2 virtual container (four S-VC2 virtual subcontainers) will then be per multiframe 6720 kbits/sec and the rate $D_{vc12}$ for a VC12 virtual container (four S-VC12 virtual subcontainers) 2112 kbits/sec.

Still with regard to direct introduction, the padding data can also be transmitted by being collected together in specific subcontainers, which are then mixed with subcontainers of useful data.

Figure 6B:
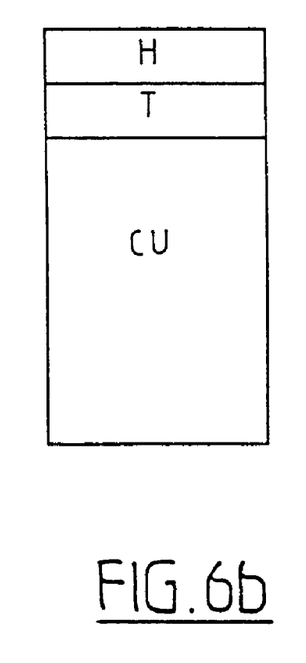
Figure 6C:
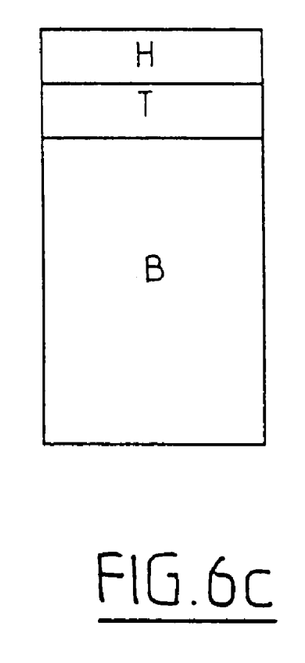

FIG. 6b depicts a subcontainer of useful data whilst FIG. 6c depicts a padding subcontainer. It will be noted that each contains an indication of belonging to one or other type, which is for example contained in a specific octet T of the virtual subcontainer in question. This information, which is binary, has the advantage of being simple to protect against any errors.

The octet T has its first seven bits expressing the binary word 1010101 when the subcontainer is transporting useful data DU and the binary word 0101010 when it is transporting padding data B. Thus, at the receiving equipment, the octet will be recognised by calculating the Hamming distance between the first seven bits of the octet received and the value 1010101. If this distance is less than four, this means that the octet T has the value 1010101 and the container received is transporting useful data DU. On the other hand, if this distance is greater than or equal to four, this means that the octet T has the value 0101010 and that the container received is transporting padding data B.

As before, the useful load CU will have a maximum length of 33 or 105 octets and the maximum transmission $D_{VC2}$ provided by a VC2 virtual container (four S-VC2 virtual subcontainers) will then be per multiframe 6720 kbits/sec and the rate $D_{VC12}$ for a VC12 virtual container (four S-VC12 virtual subcontainers) 2112 kbits/sec.

It will be understood that then, if N is the number of reserved containers on the SDH link, the total reserved rate will be N×2112 kbits/sec for VC12 virtual containers and N×6720 kbits/sec for VC2 virtual containers.

The unit 22 is controlled by the unit 23, which analyses the overhead octets H (V5, J2, N2, K4), but also the octets L or T. Only the blocks of useful data DU are then delivered to the recovery unit 24.

Where padding data are inserted at the ATM physical layer rather than at the containers, from the point of view of the SDH layer, all the data transported are useful data without distinction.

The ATM layer supports this type of padding data. This is because the ATM cells are structured as a header of five octets and a useful load in 48 octets. It should be noted that, in AAL1, the useful load is reduced to 47 octets. The header makes it possible to define the type of load transported in the cell. The following value stored in the first four octets of the header indicates that it is a padding cell:

| Octet 1 | Octet 2 | Octet 3 | Octet 4 |
|---|---|---|---|
| 0000 0000 | 0000 0000 | 0000 0000 | 0000 0001 |

In order best to adjust the rate of the incoming flow to that of the N containers reserved or concatenated in the SDH frame, the number N of containers being fixed during the learning phase, the automatic rate controller of the ATM layer inserts, in each container, either padding cells or useful data cells.

The size of a virtual container is 140 (4×35) or 428 (4×107) octets according to the type of container processed by the equipment, VC12-xc or VC2-xc, including four overhead octets POH (V5, J2, N2 or K4), that is to say in total 136 or 424 useful load octets, which will be used for transporting the ATM cells which, for their part, contain 53 octets. No alignment between the container and the ATM cells is effected so that the ATM cells can be distributed over two consecutive containers.

It will be understood that a VC12 virtual container transports 4×34 octets of useful data per multiframe, which corresponds to a rate $D_{vc12}$ of 2176 kbits/sec per C12 container. As for a VC2 virtual container, this transports 4×106 octets of useful data per multiframe, which corresponds to a rate $D_{VC2}$ of 6784 kbits/sec per C2 container.

In the case of the processing of the padding by direct introduction of the padding data, the automatic rate control process implemented by the unit is as follows.

If the difference between the values respectively carried by the high pointer ph and the low pointer pb of the buffer 12 is greater than the size of one subcontainer, that is to say 33 or 105 octets, the automatic control unit 16 extracts from the buffer 12 the useful data DU necessary for filling one or more containers, until the difference between the values ph and pb carried by the said pointers becomes less than the size of one subcontainer.

If this difference is less than the size of one subcontainer, then the automatic control unit 16 delivers padding data B intended to be inserted in subcontainers, as previously described, until the said difference once again becomes greater than the size of one subcontainer.

A process implemented by the automatic rate control unit 16 is now described in the case of the processing of the padding at the ATM layer. If the difference between the respective values carried by the two pointers ph and pb of the buffer 12 is greater than the size of an ATM cell, that is to say 53 octets (or 47 octets in the case of AAL1), the automatic rate control unit 16 extracts one or more data cells from the buffer 12 until the difference between the two pointer values ph and pb are less than the size of one cell. If the difference between the values respectively carried by the two pointers ph and pb of the buffer 12 is less than the size of one cell, then the automatic controller 16 inserts padding cells.

Where the padding B is inserted at the ATM physical layer, the padding cells are rejected by the unit 22 in order to have only ATM cells and useful data at the output 25.

The invention claimed is:

1. Equipment for enabling the transmission of data by a synchronous network, said equipment comprising at least one item of transmitting equipment and at least one item of receiving equipment, said transmitting equipment being arranged to respond to the data for inserting the data in concatenated virtual containers and for inserting the virtual containers in synchronous frames for transmission to said receiving equipment, said transmitting equipment including a unit for measuring the transmission rate of incoming data flow and a parameterizing unit for deriving, from the measurement made by said measuring unit an indication of the total number of virtual containers of lower order to be virtually concatenated in order to transport said data flow in said frames, a header of each concatenated container being arranged for carrying a message including indications of the total number of concatenated containers and the order number of said container amongst said concatenated containers.

2. The equipment according to claim 1 wherein said transmitting equipment is arranged to function according to at least two distinct phases, an initialization phase during which the measuring unit is arranged for measuring the rate of the incoming flow and the parameterizing unit is arranged for deriving therefrom an indication of the total number of virtual containers to be reserved in the synchronous frame in order to concatenate the virtual containers so as to transport said data of the incoming flow, followed by a normal operating phase during which the transmitting equipment is arranged for inserting said data in said reserved concatenated virtual containers, said transmitting equipment being arranged to exit from said normal operating phase, and to enter said an initialization phase in response to said measuring unit indicating that said measured rate is greater than the maximum rate which can be offered by the total number of reserved concatenated containers.

3. The equipment according to claim 1 wherein said transmitting equipment comprises a container formation unit for forming said concatenated containers in response on the one hand of the useful data of the incoming flow and on the other hand, if these containers are not available in sufficient quantity at the time the concatenated containers are formed, by padding data necessary for saturating the rate offered by said virtual containers.

4. The equipment according to claim 3, wherein each subcontainer has, in addition to its header, a length octet for representing the quantity of useful data and/or the quantity of padding in its useful load.

5. The equipment according to claim 3, wherein said transmitting equipment has a buffer which is arranged to be supplied by said incoming flow and which is arranged to deliver blocks of useful data to said formation unit at its request, and a control unit for selectively controlling (a) delivery by said buffer of one or more blocks of useful data when these data are available in said buffer and (b) delivering blocks of padding data when the quantity of useful data in said buffer is less than the quantity of data in a block.

6. The data transmission system according to claim 5, wherein each of said blocks of data has the size of a virtual subcontainer so as to fill the useful load of the virtual subcontainer, each virtual subcontainer being either of a type enabling it to contain useful data or of a type enabling it to contain padding data.

7. The equipment according to claim 6, wherein each subcontainer comprises, in addition to its header, an octet representing the type of data which the subcontainer contains.

8. The equipment according to claim 7, wherein said network is of the SDH type in accordance with Recommendation G.707, and for a given concatenated virtual container, the transmitting equipment is arranged for causing said message to include sixteen J2 header octets successively transmitted in sixteen successive multiframes.

9. The equipment according to claim 5 wherein said buffer is arranged for delivering the respective values of a high pointer and a low pointer, said control unit being arranged for delivering blocks of padding data when the difference between these two values is less than the size of a subcontainer, until said difference once again becomes greater than the size of a subcontainer, said control unit then being arranged for controlling the delivery, by the buffer, of the blocks of data which the buffer contains.

10. Data transmission system according to claim 5, wherein said incoming flow includes a flow of ATM cells, and each of said blocks of data has the size of one or more ATM cells.

11. Data transmission system according to claim 1 wherein said receiving equipment includes, at its output, a buffer which is arranged to (a) be supplied by the recovered data extracted from said concatenated virtual containers received, at the rhythm of the extraction of said data and (b) read the extracting data at a regular rhythm.

12. The equipment according to claim 1 wherein said message also carries an identifier for said transmitting equipment.

13. A system including the transmitter equipment of claim 1 and a receiver adapted to be responsive to the message transmitted by the transmitter equipment, said receiving equipment being arranged to deliver to an output thereof only the containers carrying said message, in the order given by said message.

14. Data transmission system according to claim 13, wherein said receiving equipment is arranged to function according to at least two distinct phases, a learning phase in which, by using the message carried by each of said containers, said receiving equipment is arranged to mark in the received frames an indication of the position of each concatenated container received, and a normal operating phase in which, on the basis of each position thus determined, the receiving equipment is arranged to deliver said concatenated containers to a unit for recovering said data.

15. The equipment according to claim 13, wherein
said transmitting equipment comprises a container formation unit for forming said concatenated containers in response on the one hand of the useful data of the incoming flow and on the other hand, if these containers are not available in sufficient quantity at the time the concatenated containers are formed, by padding data necessary for saturating the rate offered by said virtual containers;
said transmitting equipment has a buffer which is arranged to be supplied by said incoming flow and which is arranged to deliver blocks of useful data to said formation unit at its request, and a control unit for selectively controlling (a) delivery by said buffer of one or more blocks of useful data when these data are available in said buffer and (b) delivering blocks of padding data when the quantity of useful data in said buffer is less than the quantity of data in a block;
each of said blocks of data has the size of a virtual subcontainer so as to fill the useful load of the virtual subcontainer, each virtual subcontainer being either of a type enabling it to contain useful data or of a type enabling it to contain padding data; and
said type octet has seven bits which express the word 1010101 when said subcontainer is transporting useful data and the word 0101010 when it is transporting padding data, the receiving equipment being arranged for (a) recognizing said octet by calculating the Hamming distance between the seven bits of the octet received and the value 1010101 and by comparing this distance with the numerical value four, (b) receiving a subcontainer including useful data if the distance is less than four and (c) receiving a subcontainer including padding data if the distance is greater than or equal to four.

16. The system according to claim 13, wherein
said transmitting equipment comprises a container formation unit for forming said concatenated containers in response on the one hand of the useful data of the incoming flow and on the other hand, if these containers are not available in sufficient quantity at the time the concatenated containers are formed, by padding data necessary for saturating the rate offered by said virtual containers;
each subcontainer has, in addition to its header, a length octet for representing the quantity of useful data and/or the quantity of padding in its useful load; and
said receiving equipment is arranged for storing blocks of said data in a multiframe by consecutively filling the reserved containers.

17. The system according to claim 13 wherein said receiving equipment is arranged for storing blocks of the data in a multiframe by distributing, one after the other, said blocks on the reserved containers.

18. A method of supplying data for transmission by a synchronous network to a receiver, said data, prior to transmission, being inserted in virtual containers which are themselves inserted in synchronous frames in order to be transmitted, wherein the method comprises measuring the rate of the flow of incoming data to be transmitted, deriving from said measurement an indication of the total number of virtual containers to be concatenated in order to transport said data flow in said frames, and providing each of said containers to be concatenated with a message indicating the total number of concatenated containers as well as the order number of said container amongst said concatenated containers.

19. Data transmission method according to claim 18, wherein said network is of the SDH type in accordance with Recommendation G.707 and for a given concatenated virtual container, said message includes sixteen J2 header octets successively transmitted in sixteen successive multiframes.

20. The data transmission method according to claim 18 in combination with receiving a frame including the concatenated containers, performing two distinct steps on the second frame, the first step being a learning step in which, in response to the message carried by each of said containers, the position of each concatenated container received is recovered in the frames received, the second step being a normal functioning step in which, on the basis of each position thus determined, said concatenated containers are delivered so that said data can be recovered.

21. Data transmission method according to claim 20 further including putting back in phase, on reception, the concatenated containers out of phase by several multiframes by analyzing the phase difference between octets constituting the message carried by each of them.

22. Data transmission method according to claim 18 wherein, on transmission, two distinct phases are performed: an initialization phase during which a measurement of the incoming flow rate is carried out and an indication of the total number of virtual containers to be reserved for the transportation of said data of the incoming flow is derived, and a normal functioning phase during which said data of the incoming flow are inserted in said reserved virtual containers, said normal functioning phase being replaced by said initialization phase when said measured rate is greater than the maximum rate which can be offered by the total number of reserved concatenated containers.

23. Data transmission method according to claim 18 further comprising using, for forming said concatenated containers, on the one hand useful data of the incoming flow and on the other hand, if these useful data are not available in sufficient quantity at the time the concatenated containers are formed, using padding data necessary for saturating the flow offered by said virtual containers.

24. Data transmission method according to claim 18 wherein said message also carries an identifier for said transmitting equipment.

25. A method of forming a synchronous frame for the transportation of data flows, comprising inserting said data in virtual containers that are themselves inserted in said synchronous frame, concatenating said containers with each other, and causing each concatenated container to carry a message giving an indication of the total number of concatenated containers as well as the order number of said container amongst said concatenated containers.

26. The method according to claim 25, wherein the frame is of the SDH type in accordance with Recommendation G.707, and for a given concatenated virtual container, said message includes sixteen J2 header octets successively transmitted in sixteen successive multiframes.

27. The method according to claim 25 further including inserting into each container, a header, a type octet which indicates whether the container is carrying, in its useful load, useful data or padding data.

28. The method according to claim 27, wherein said type octet has seven bits which express the word 1010101 when said subcontainer is transporting useful data and the word 0101010 when it is transporting padding data.

29. The method according to claim 25, further including inserting into each container, a header, a length octet which represents the quantity of useful data and/or the quantity of padding in its useful load.

* * * * *